US012655327B2

(12) United States Patent (10) Patent No.: US 12,655,327 B2

Neff et al. (45) Date of Patent: Jun. 16, 2026

(54) BODY ADHESIVE

(71) Applicant: Ahay Society Pty Ltd, Manly (AU)

(72) Inventors: Raymond Neff, Sydney (AU); Annabel Hay, Manly (AU)

(73) Assignee: Ahay Society Pty Ltd, Manly (AU)

( * ) Notice: Subject to any disclaimer, the term of this patent is extended or adjusted under 35 U.S.C. 154(b) by 0 days.

(21) Appl. No.: 19/428,829

(22) Filed: Dec. 22, 2025

(65) Prior Publication Data

US 2026/0117101 A1 Apr. 30, 2026

Related U.S. Application Data

(63) Continuation of application No. 18/560,141, filed as application No. PCT/AU2023/050079 on Feb. 8, 2023.

(30) Foreign Application Priority Data

Apr. 14, 2022 (AU) ................................. 2022900999

(51) Int. Cl.
| | |
|---|---|
| *C09J 11/08* | (2006.01) |
| *C09J 5/00* | (2006.01) |
| *C09J 11/04* | (2006.01) |
| *C09J 11/06* | (2006.01) |
| *C09J 139/06* | (2006.01) |

(52) U.S. Cl.
CPC ................. *C09J 11/08* (2013.01); *C09J 5/00* (2013.01); *C09J 11/04* (2013.01); *C09J 11/06* (2013.01); *C09J 139/06* (2013.01)

(58) Field of Classification Search
None
See application file for complete search history.

(56) References Cited

U.S. PATENT DOCUMENTS

| | | | |
|---|---|---|---|
| 5,861,348 A * | 1/1999 | Kase | ......................... B32B 7/12 |
| | | | 602/903 |
| 8,888,556 B2 | 11/2014 | Jackson et al. | |
| 2015/0342845 A1* | 12/2015 | Hwang | .................... A61K 8/37 |
| | | | 424/59 |
| 2018/0369121 A1* | 12/2018 | Lee | ........................... A61K 8/87 |

FOREIGN PATENT DOCUMENTS

WO          2015184071 A1   12/2015

OTHER PUBLICATIONS

Hold Up Body Adhesive [viewed on internet Nov. 10, 2023, published 2021], <URL: http://www.holdupbodyadhesive.com/product/premium-patent-pending/>.

* cited by examiner

*Primary Examiner* — Peter A Salamon
(74) *Attorney, Agent, or Firm* — Fox Rothschild LLP

(57) ABSTRACT

The present invention relates to body adhesive formulations. In particular, body adhesives that are water resistant yet are washable and removeable by way of washing in water in accordance with the garment's manufacturers instructions. The present formulations comprise one or more water soluble polymers, one or more waterproofing agents, and glycerin in at least one volatile solvent. The preferable formulation contained Trimethylpentanediol/Adipic Acid/Glycerin Crosspolymer (Lexorez 200 MB) and VP/VA (Luviskol VA 64 P comprising an acetic acid, ethenyl ester, polymer with 1-ethenyl-2-pyrrolidinone), silica gel and isopropanol as solvent, glycerine, and Geogard ECT (Benzyl Alcohol, Salicylic Acid, Glycerin, Sorbic Acid) as preservative.

9 Claims, No Drawings

BODY ADHESIVE

CROSS REFERENCE TO RELATED APPLICATIONS

This application is a continuation of U.S. patent application Ser. No. 18/560,141, filed Nov. 10, 2023, which is the U.S. national phase of International Patent Application No. PCTIAU2023/050079, filed Feb. 8, 2023, which claims priority to Australian Patent Application No. 2022900999, filed Apr. 14, 2022, the contents of which are incorporated herein by reference in their entirety.

TECHNICAL FIELD

The invention is in the field of cosmetic formulations and personal care products. Specifically, the invention lies in the field of cosmetic adhesives able to be used on the body for fashion and other related purposes.

BACKGROUND ART

Many cosmetic adhesives are non-water-soluble. Although they have excellent adhesive properties and resist sweat and moisture, they cannot be removed from skin or fabric with water alone. Either solvent is required, or certain fabrics cannot be cleaned without damage. Examples are latex adhesives and acrylic emulsions.

Water-soluble adhesives are typically based on VP/VA copolymer, polyvinyl acetate or polyvinyl alcohol. They may also contain solvents (ethanol, isopropanol and/or water) and glycerin. Carbomer has been employed as a thickening agent, but this must be neutralized with a base (aminomethyl propanol) and must contain water to dissolve the agent (which increases drying time and limits the ability to add a waterproofing agent). Although these adhesives can be removed with water, they have minimal resistance to sweat and moisture. A water-soluble sweat-resistant version which contains adipic acid/diglycol crosspolymer as a waterproofing agent is available however, this additive reduces the water solubility and requires additional effort to remove from clothing. Moreover, adipic acid/diglycol crosspolymer is not soluble in water or isopropyl alcohol, thus the product has potential stability issues.

A reference to any prior art is no admission as to the status of the prior art and the common general knowledge. A reference to specific prior art is not an indication that the prior art is common general knowledge or known to the skilled reader.

It is an object of the present invention to provide a cosmetic adhesive which ameliorates at least some of the deficiencies of the prior art or at least provides a useful commercial alternative to prior art formulations.

SUMMARY OF THE INVENTION

In a preferred embodiment of the invention, there is provided a cosmetic adhesive formulation for use in at least, bonding garments and fabric to the skin of a user, wherein the formulation contains a water soluble polymer, water-proofing agent, and glycerin in a volatile solvent.

Preferably the water soluble polymer includes any of VP/VA copolymers, polyvinylpyrollidone (PVP) and polyvinyl alcohol.

Preferably the waterproofing agent is any of Lexfilm® Spray (Polyester-10 and Propylene Glycol Dibenzoate); Lexorez® 100 MB (Adipic Acid/Diglycol Crosspolymer);

Lexorez® 200 MB (Trimethylpentanediol/Adipic Acid/Glycerin Crosspolymer); TruProtect® Sun (Polyester-7 Neopentyl Glycol Diheptanoate) or Lexfilm® Sun Natural (Capryloyl Glycerin/Sebacic acid Copolymer).

Preferably the formulation further comprises silica gel, Trimethylpentanediol, Adipic Acid, Glycerin Crosspolymer (Lexorez® 200 MB).

Preferably the formulation comprises silica gel between 0.2% and 10% w/w and a combination of Trimethylpentanediol, Adipic Acid and Glycerin Crosspolymer (Lexorez 200 MB) between 0.5% to 10%.

Preferably the formulation comprises silica gel between 1% and 6% w/w and a combination of Trimethylpentanediol, Adipic Acid and Glycerin Crosspolymer (Lexorez 200 MB) between 1% to 5%.

Preferably the formulation comprises silica gel at around 4% w/w and a combination of Trimethylpentanediol, Adipic Acid and Glycerin Crosspolymer (Lexorez 200 MB) at around 2%.

Preferably the silica is precipitated silica.

Preferably the formulation further comprises VP/VA Copolymer, Glycerin, Phenoxyethanol, Ethylhexylglycerin, Benzyl Alcohol, Salicylic Acid, and Sorbic Acid.

More preferably the formulation further comprises VP/VA Copolymer at between 20 and 80% w/w, Glycerin between 5 and 20% w/w, Geogard ECT (Benzyl Alcohol, Salicylic Acid, Glycerin, Sorbic Acid) between 0.1% to 5% w/w, isopropanol between 0-70% % w/w.

Still more preferably the formulation further comprises VP/VA Copolymer at between 50 and 70% w/w, Glycerin between 5 and 20% w/w, Geogard ECT (Benzyl Alcohol, Salicylic Acid, Glycerin, Sorbic Acid) between 0.2% to 2% w/w, isopropanol between 15-60% % w/w.

More preferably the formulation further comprises VP/VA Copolymer at between 45 and 48% w/w, Glycerin at around 10% w/w, Geogard ECT (Benzyl Alcohol, Salicylic Acid, Glycerin, Sorbic Acid) at around 1% w/w, isopropanol at around 35% w/w.

In a second aspect of the invention there is provided a cosmetic adhesive for use in in at least, bonding garments and fabric to the skin of a user, wherein the method includes:

applying a composition containing precipitated silica gel and a Trimethylpentanediol, Adipic Acid, Glycerin cross polymer;

bonding the garment or fabric to the skin;

dissolving and washing the adhesive off using water.

BEST MODE FOR CARRYING OUT THE INVENTION

Example 1

A study involving isopropanol and various waterproofing agents was conducted. TruProtect® Sun was obtained from Trulux Pty Ltd (Australia).

All other waterproofing agents were manufactured by Inolex Chemical Company Philadelphia USA and supplied by A.S. Harrison & Co Pty Limited (Sydney Australia).

Method: 0.5 g waterproofing agent was placed in a 20 mL glass vial, and 3.28 g isopropanol was added. The mixture was stirred vigorously by hand using a metal paddle. The following waterproofing agents were utilised:

a. Lexfilm® Spray (Polyester-10 and Propylene Glycol Dibenzoate).

b. Lexorez® 100 MB (Adipic Acid/Diglycol Crosspolymer).

3

C. Lexorez® 200 MB (Trimethylpentanediol/Adipic Acid/Glycerin Crosspolymer).

d. TruProtect® Sun (Polyester-7 Neopentyl Glycol Diheptanoate).

e. Lexfilm® Sun Natural (Capryloyl Glycerin/Sebacic acid Copolymer).

All of the formulations were of acceptable clarity and stability but formulation (c) was the best. From this, Lexorez 200 MB was chosen for further evaluation.

Lexorez® 100 MB and Lexorez® 200 MB are proprietary formulations manufactured by Inolex Chemical Company Philadelphia USA. They are comprised of Trimethylpentanediol/Adipic Acid/Glycerin crosspolymer that differ between them by their degree of cross linking. Their preparation and use are described in U.S. Pat. Nos. 5,833,961 and 5,989,527 which are incorporated herein by way of reference.

Example 2

All of the following exemplary formulations contain VP/VA copolymer, glycerin and a preservative. Formulation 1 utilises isopropanol as a solvent. Formulation 2 contains a traditional water-soluble thickening agent (xanthan gum) but contains water as the solvent. Formulation 3 uses isopropanol as the solvent and silica as a thickening agent. Silica can thicken alcohol-based formulas without water. Moreover, Formulation 3 contains Lexorez® 200 MB (Trimethylpentanediol/Adipic Acid/Glycerin Crosspolymer) as a waterproofing agent. This was found to be soluble and stable in the ispropropanol solvent. The silica gel was capable of absorbing moisture after application, thus it functioned as a second waterproofing agent. VP/VA Copolymer referenced is Luviskol VA 64 P comprising an acetic acid, ethenyl ester, polymer with 1-ethenyl-2-pyrrolidinone, obtained from BASF. Xanthan Gum is Rheocare® XGN, obtained from BASF AG. Precipitated silica was obtained from New Directions Australia. Fumed silica can also be used at lower concentrations or a mixture of the two types of silica powder can also be substituted when silica is called for in the method set out below.

Trimethylpentanediol/Adipic Acid/Glycerin Crosspolymer (Lexorez® MB 200) was manufactured by Inolex and obtained from A.S. Harrison. Glycerin (palm-free), Phenoxyethanol/Ethylhexylglycerin and Geogard ECT (preservative) were obtained from Trulux.

Water is deionized water, prepared in-house. Isopropanol (Hypergrade for LC) was obtained from Chem Supply Pty Ltd.

TABLE 1

Constituents of Formulations

| Constituent | Formulation 1 (g) | Formulation 2 (g) | Formulation 3 (g) |
|---|---|---|---|
| VP/VA Copolymer | 45 | 50 | 48 |
| Xanthan Gum | — | 0.2 | — |
| Silica | — | — | 4 |
| Water | — | 39 | — |
| Isopropanol | 44 | — | 35 |
| Lexorez 200 MB (crosspolymer) | — | — | 2 |
| Glycerin | 10 | 10 | 10 |

4

TABLE 1-continued

Constituents of Formulations

| Constituent | Formulation 1 (g) | Formulation 2 (g) | Formulation 3 (g) |
|---|---|---|---|
| Phenoxyethanol/Ethylhexylglycerin | — | 0.8 | — |
| Geogard ECT (Benzyl Alcohol, Salicylic Acid, Glycerin, Sorbic Acid) | 1 | — | 1 |

Formulation 1: A 60 g batch was prepared. All ingredients were placed in a 125 ml jar and mixing by hand with metal paddle for 2 minutes. Mixture was clear after 15 hours at room temperature.

Formulation 2: A 50 g batch was prepared. VP/VA copolymer and xantham gum were dry blended in the jar with a metal paddle. The liquid ingredients were then added and mixed by hand with a metal paddle for 2 minutes. The mixture underwent a slight exotherm upon mixing. The mixture was clear after 15 hours at room temperature.

Formulation 3: A 50 g batch was prepared. VP/VA copolymer and silica were dry blended in the jar with a metal paddle. Trimethylpentanediol/Adipic Acid/Glycerin Crosspolymer (Lexorez 200 MB) and isopropanol were mixed by hand in a 125 ml jar using the metal paddle until the mixture was clear. The liquid ingredients were then added to the jar and the contents mixed by hand with a metal paddle for 2 minutes. The mixture was uniform but translucent (due to the silica gel) after 15 hours at room temperature with no settling of solids.

Table 2 provides the feedback from evaluations of the 3 example formulations. The viscosity of Example 3 leads to optimal consistency and workability. Moreover, the combination of VA/VP copolymer, silica gel and Trimethylpentanediol/Adipic Acid/Glycerin Crosspolymer leads to an optimal balance of durability, sweat and moisture resistance and ability to wash the product from skin and fabric using water.

TABLE 2

Feedback from panel evaluations
(rating 1-5 - poor to 5 very good)

| Category | Formulation 1 | Formulation 2 | Formulation 3 |
|---|---|---|---|
| Consistency | 2 | 3 | 4 |
| Application and Fabric effects | 1 | 1 | 5 |
| Dry Time | 3 | 4 | 4 |
| Workability | 2 | 3 | 5 |
| Integrity | 4 | 5 | 5 |
| Durability/Sweat Resistance | 2 | 3 | 5 |
| Removability | 4 | 4 | 3 |
| Washability | 4 | 4 | 4 |
| Allergies | 5 | 5 | 5 |
| Experience | 3 | 3 | 5 |
| Totals | 30 | 35 | 45 |

The skilled reader appreciates that the disclosure in one example can be combined with disclosure contained in other examples to arrive at formulations that fall within the scope of the present invention.

INDUSTRIAL APPLICABILITY

The present invention has industrial applicability as a cosmetic adhesive used to bond fabric to skin. This has application in the cosmetics and apparel industries.

The invention claimed is:

1. A cosmetic adhesive formulation for use in at least bonding garments and fabric to the skin of a user, wherein the formulation comprises at least:

a combination of Trimethylpentanediol, Adipic Acid, and Glycerin Crosspolymer;
VP/VA Copolymer;
glycerin;
silica; and
isopropanol as solvent.

2. The cosmetic adhesive formulation of claim 1, wherein the formulation comprises silica between 0.2% and 10% w/w and the combination of Trimethylpentanediol, Adipic Acid, and Glycerin crosspolymer between 0.5% to 10%.

3. The cosmetic adhesive formulation of claim 2, wherein the formulation comprises silica between 1% and 6% w/w and the combination of Trimethylpentanediol, Adipic Acid, and Glycerin crosspolymer between 1% to 5%.

4. The cosmetic adhesive formulation of claim 3, wherein the formulation comprises silica at around 4% w/w and the combination of Trimethylpentanediol, Adipic Acid, and Glycerin crosspolymer at around 2%.

5. The cosmetic adhesive formulation of claim 4, wherein the formulation further comprises any of the following:

Glycerin;
Phenoxyethanol;
Ethylhexylglycerin;
Benzyl Alcohol;
Salicylic Acid; and
Sorbic Acid.

6. The cosmetic adhesive formulation of claim 5, wherein the formulation further comprises VP/VA Copolymer at between 20 and 80% w/w, Glycerin between 5 and 20% w/w, the combination of Benzyl Alcohol, Salicylic Acid, Glycerin, and Sorbic Acid between 0.1% to 5% w/w, and isopropanol between 0-70% % w/w.

7. The cosmetic adhesive formulation of claim 6, wherein the formulation further comprises VP/VA Copolymer at between 50 and 70% w/w, Glycerin between 5 and 20% w/w, the combination of Benzyl Alcohol, Salicylic Acid, Glycerin, and Sorbic Acid between 0.2% to 2% w/w, and isopropanol between 15-60% % w/w.

8. The cosmetic adhesive formulation of claim 7, wherein the formulation further comprises VP/VA Copolymer at between 45 and 48% w/w, Glycerin at around 10% w/w, the combination of Benzyl Alcohol, Salicylic Acid, Glycerin, and Sorbic Acid at around 1% w/w, and isopropanol at around 35% w/w.

9. A method of using a cosmetic adhesive of claim 8, comprising:

applying the cosmetic adhesive of claim 8 to either the user's skin or the garments or fabric, forming a bond therebetween upon contacting the skin and the garments or fabric;

dissolving and washing the adhesive off using water after the bond is no longer required;

laundering the garments or fabric as per the manufacturer's normal instructions to remove traces of the said adhesive.

* * * * *